United States Patent [19]

Sabo et al.

[11] Patent Number: 5,437,789

[45] Date of Patent: Aug. 1, 1995

[54] WASHING MACHINE LINT STRAINER

[76] Inventors: Darrick Karl Sabo; Susan Jane Sabo, both of 3174 Sunnywood, Ann Arbor, Mich. 48103

[21] Appl. No.: 110,183

[22] Filed: Aug. 20, 1993

[51] Int. Cl.⁶ .............................................. B01D 29/03
[52] U.S. Cl. ................................... 210/357; 210/460; 210/473
[58] Field of Search ............... 210/298, 317, 350, 357, 210/413, 459, 460, 461, 462, 463, 473

[56] References Cited

U.S. PATENT DOCUMENTS

| | | | |
|---|---|---|---|
| 565,250 | 8/1896 | Ziegler | 210/357 |
| 1,708,817 | 4/1929 | Winger | 210/459 |
| 2,365,525 | 12/1944 | Cox | 210/357 |
| 2,494,780 | 1/1950 | Schmidt | 210/357 |
| 3,348,688 | 10/1967 | Patterson | 210/473 |
| 3,365,063 | 1/1968 | Cobb et al. | 210/473 |
| 3,487,944 | 1/1970 | Tucker . | |
| 3,755,072 | 8/1973 | Ostberg et al. | 210/357 |
| 4,123,361 | 10/1978 | Marschman . | |
| 4,217,667 | 8/1980 | Whitehouse . | |
| 4,806,241 | 2/1989 | Holien . | |
| 4,970,880 | 11/1990 | Luger . | |

*Primary Examiner*—Robert A. Dawson
*Assistant Examiner*—W. L. Walker

[57] ABSTRACT

An improved washing machine lint strainer of the type to receive discharge from a hose is characterized by retractable strainer elements that are wiped clean of lint as they retract leaving the lint in one mass for easy removal without the necessity of manually picking out lint from small strainer holes. This strainer does not need to be discarded when it is totally full of lint and is thus reusable. Preferred embodiments consist of a set of two strainer components with parallel fingers forming spaces between each finger element. The 2 similar strainer components are placed on top of each other and touching with the spaces between the finger oriented to form a matrix of holes through both strainers that pass liquid and strain lint. The strainers are wiped free of lint as they are retracted to open the strainer box and the lint then falls off the strainer fingers and is thus left behind for easy disposal.

1 Claim, 4 Drawing Sheets

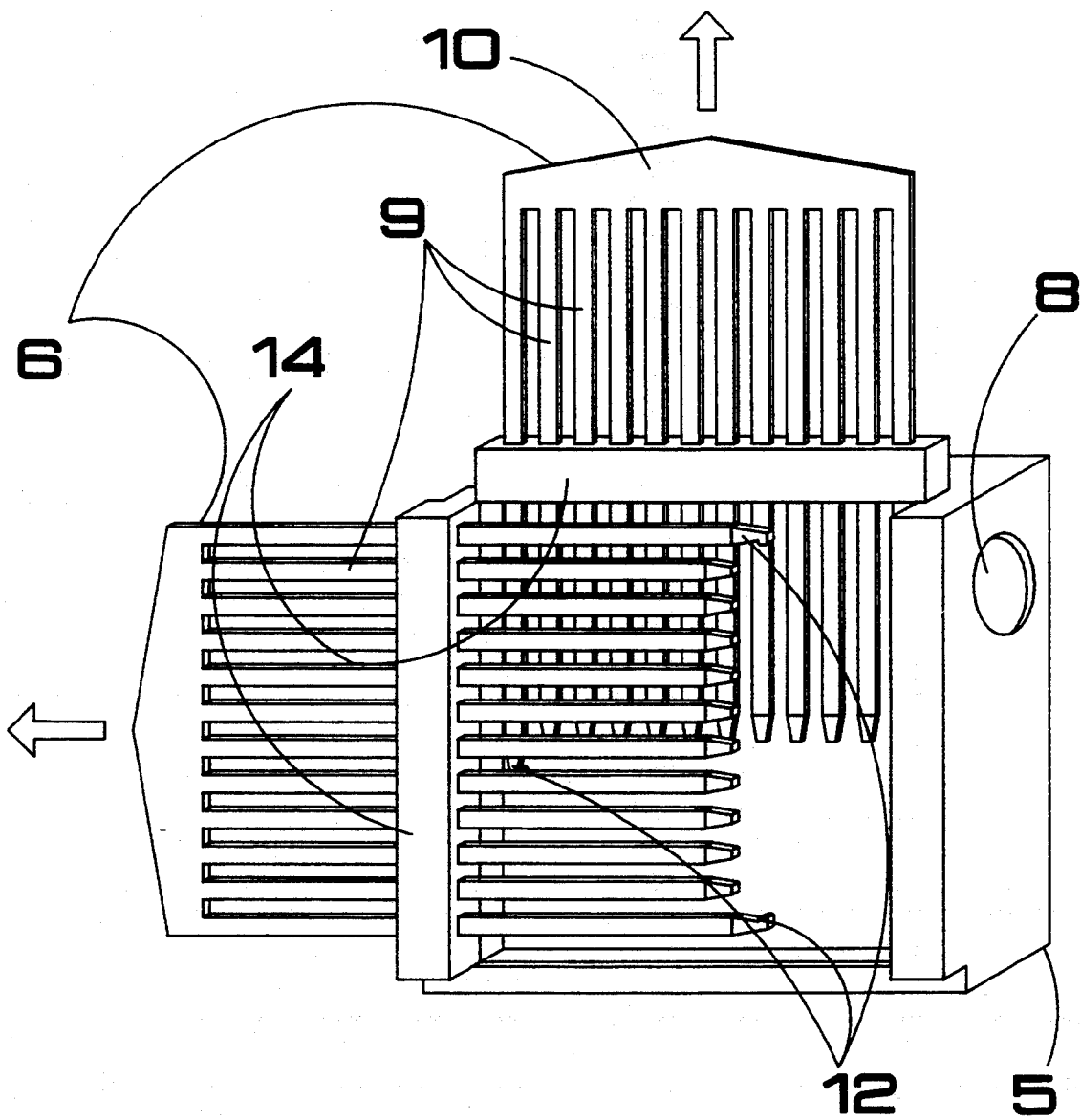

WASHING MACHINE LINT STRAINER

| U.S. PAT. DOCUMENTS | | |
|---|---|---|
| 4,970,880 | 11/20/1990 | Luger |
| 4,806,241 | 2/21/1989 | Holien |
| 4,217,667 | 8/19/1980 | Whitehouse |
| 4,123,361 | 10/31/1978 | Marschman |
| 3,487,944 | 1/6/1970 | Tucker |

FIELD OF THE INVENTION

This invention relates to straining lint from the discharge of a washing machine. More specifically, the invention relates to straining devices located on washing machine discharge conduits that empty into sinks, tubs or the like and also relates to strainers located directly on the tub or sink drain itself for the purpose of keeping washing machine lint from plugging up drains.

BACKGROUND OF THE INVENTION

One well-known problem with washing machine lint strainers is the problem of lint removal from the strainer itself. The lint fibers become entwined within the small strainer openings making the lint difficult to remove from the individual strainer holes.

Other strainers or filters cannot be easily cleaned and are discarded after they are filled up with lint. Also, without a lint strainer, drain pipes may eventually accumulate lint and thus will have to be cleaned.

U.S. Pat. Nos. 565,250; 2,365,525; 2,494,780; 1,708,817; and 3,755,072 all contain an extra device called a cleaning element and operation of this cleaning element as the means to clean the strainer.

U.S. Pat. No. 4,970,880 U.S, shows a lint trap but it is primarily intended to be disposed of when it is full of lint. Cleaning the lint trap is hardly possible.

U.S. Pat. No. 4,217,667 is reusable, but difficult and time consuming to clean.

U.S. Pat. No. 3,487,944 can be cleaned, but cleaning is time-consuming requiring the removal of a nut, screen and cross member and possible use of a wrench. It also requires the use of expensive clamps for attachment to the washing machine hose. This filter will also clog up with lint fast because of the small screen area.

U.S. Pat. No. 4,806,241 and U.S. Pat. No. 4,217,667 both attach to the tub drain and may have to be removed if the tub is to be used for other than washing machine discharge such as filling up a pail of tap water in the tub thus making other use of the tub inconvenient.

U.S. Pat. No. 4,123,361 is reusable but it is difficult to clean the lint out of the small holes.

U.S. Pat. No. 4,970,880 and U.S Pat. No. 4,123,361 cause excessive washing machine discharge back pressure when the inventions are totally full of lint.

OBJECT OF THE INVENTION

The object of this invention is to provide an improved washing machine straining device that overcomes the problems of previous art mentioned above.

One object of this invention is to provide lint removal from the strainer that is easy and fast.

Another object of this invention is a high capacity for retaining lint.

Another object of this invention is to provide visual indication that the strainer is full of lint.

Another object of this invention is to prevent complete blockage of washing machine discharge due to a lint strainer totally clogged with lint thus preventing washing machine discharge from exiting the lint strainer. Blockage of washing machine discharge will put excessive strain on the washing machine discharge pump. Another object of this invention is to provide easy attachment of the strainer assembly to the washing machine hose.

SUMMARY OF THE INVENTION

This invention is a box-shaped strainer assembly containing a set of two similar strainer (finger elements) components. The spaces between the fingers of both finger elements are openings through which liquid may pass but lint may not pass. The fingers of one finger element of the set are parallel to each other which in turn are all perpendicular to the fingers of the other finger element. The two finger elements are then placed flat against each other. The crossed fingers of the finger elements are oriented to form a matrix of holes through both finger elements through which liquid may pass but which retain lint. The angle formed by the fingers of one finger element to the fingers of the other finger element when they are placed flat against each other may be other than perpendicular as long as a matrix of holes is formed. The two finger elements together then form a strainer set that is a more efficient lint strainer than the above single strainer because of the resulting smaller openings to pass water and not lint. The size of these straining holes are comparable to existing art and are approximately 0.1 inch each side of the square hole. Other strainer hole geometry may also be chosen.

The number of fingers on the first finger element may be the same or different from the number of fingers on the second finger element depending on the size of the box opening. The length of the fingers on the first finger element may be the same or different from the fingers of the second finger element depending on the size of the opening in the box. In general, the number of fingers and the length of the fingers can vary depending on the amount of lint to be trapped before the strainer needs cleaning. The fingers cross-sectional shape may be square, rectangular, cylindrical or other geometrical shape. The tips of the fingers are tapered so that the fingers of the strainers will glide smoothly past each other without interference during strainer retraction and closure. The last and first fingers of each strainer have enlarged tips to help prevent total removal of the finger element from the box. The ends of these fingers rest behind a narrow edge on the face of the box when they are closed for straining lint.

Each finger of one finger element passes through a positioning hole in the edge of the strainer box in order to secure the strainer to the strainer box. Likewise each finger of the other finger element passes through positioning holes in the edge of the strainer box on an adjacent side. The positioning holes formed in the strainer box conform closely to the outer surface of the fingers. The wall thickness of the strainer box is greater at the edges of the two adjacent sides where the positioning holes are formed in order to help keep the strainer finger elements more secure. When the finger elements are inserted as far into the box as possible the two finger elements form a matrix of holes through both finger elements through which liquid may pass but not lint because of the resulting small hole size. When the finger elements are full of trapped lint they are manually retracted. The positioning holes formed in the strainer box removes lint from the fingers by wiping them clean as they are retracted.

This lint strainer is unique in that no separate cleaning element is required to clean the strainer. The act of opening the strainer box to remove lint, by the strainer fingers drawing back (retracting) through the holes formed in the strainer box, with a wiping action, gathers the lint at adjacent sides of the strainer box thus cleaning the strainer. The strainer is thus self cleaning during the act of opening the strainer box without having to manually pick out lint from strainer holes, without mechanical disassembly or without back flushing. Also, an extra operation is required to clean other strainers such as manipulating a cleaning element.

A variation of the strainer box includes holes at the opposite ends from the wiping holes to receive the tapered ends of the fingers when the finger elements are fully closed. This will aid in securing the ends of the fingers rather than letting them float free behind the narrow edge on the face of the strainer box.

Another variation of the strainer fingers is the addition of a rib on the back side of each finger along its entire length in order to add strength. This would give the fingers a cross-sectional T-shape.

Another variation is the use of more than one strainer set to configure a multistage strainer.

Another variation of the strainer assembly is the use of only one strainer if the spacing between the fingers is made very small to efficiently trap lint.

The washing machine hose discharge enters the finger element box through an inlet opening in the top of the box. This opening is a short conduit extension of the top. There are two tapped holes in the box conduit for the insertion of screws to clamp down on the washing machine hose tight enough to secure it but not tight enough to damage the hose that is inserted into the box conduit. The box can be secured by the connection of the box conduit to the washing machine hose as above or, for a variation, the box can also be hung on the side of the tub with two hanging hooks that extend from two tabs with holes on the back of the box and extend upward to the top edge of the tub in a hook configuration that wraps around the top edge of the tub.

The material used for this strainer assembly is known to the people familiar with the art of this invention and is a semi-rigid plastic.

Another variation is a short conduit box extension of the top that interfaces with the washing machine discharge hose via an adapter tube and clamps or ties. Another variation of the connection of the box to the washing machine discharge hose is a simple opening with no conduit box extension of the top of the strainer box. The strainer box is then hung on the side of the tub. The washing machine discharge hose is simply inserted through the hole in the top of the strainer box. This requires no physical connection between the strainer box and washing machine discharge hose and no use of clamps or ties.

Liquid exiting the strainer from only the top-most holes is an indicator that the lint strainer needs cleaning. This results from the lower strainer holes becoming clogged with lint first. An overflow outlet hole located in one side of the box and near the top can also act as an indicator that the strainer needs cleaning when liquid is seen exiting from the overflow outlet hole. This overflow outlet hole also relieves washing machine discharge back pressure if the strainer is totally full of lint and thus the washing machine discharge pump is not stressed.

This strainer configuration can be used for straining fluid other than washing machine discharge for other applications.

This strainer configuration, when built into a washing machine and an integral part of the washing machine, is another variation and application for this inventive lint strainer.

BRIEF DESCRIPTION OF THE DRAWINGS

FIG. 4 shows the finger elements in the strainer assembly partially opened by retracting them in the direction shown by the arrows.

DETAILED DESCRIPTION OF PREFERRED EMBODIMENT

Figure 1:
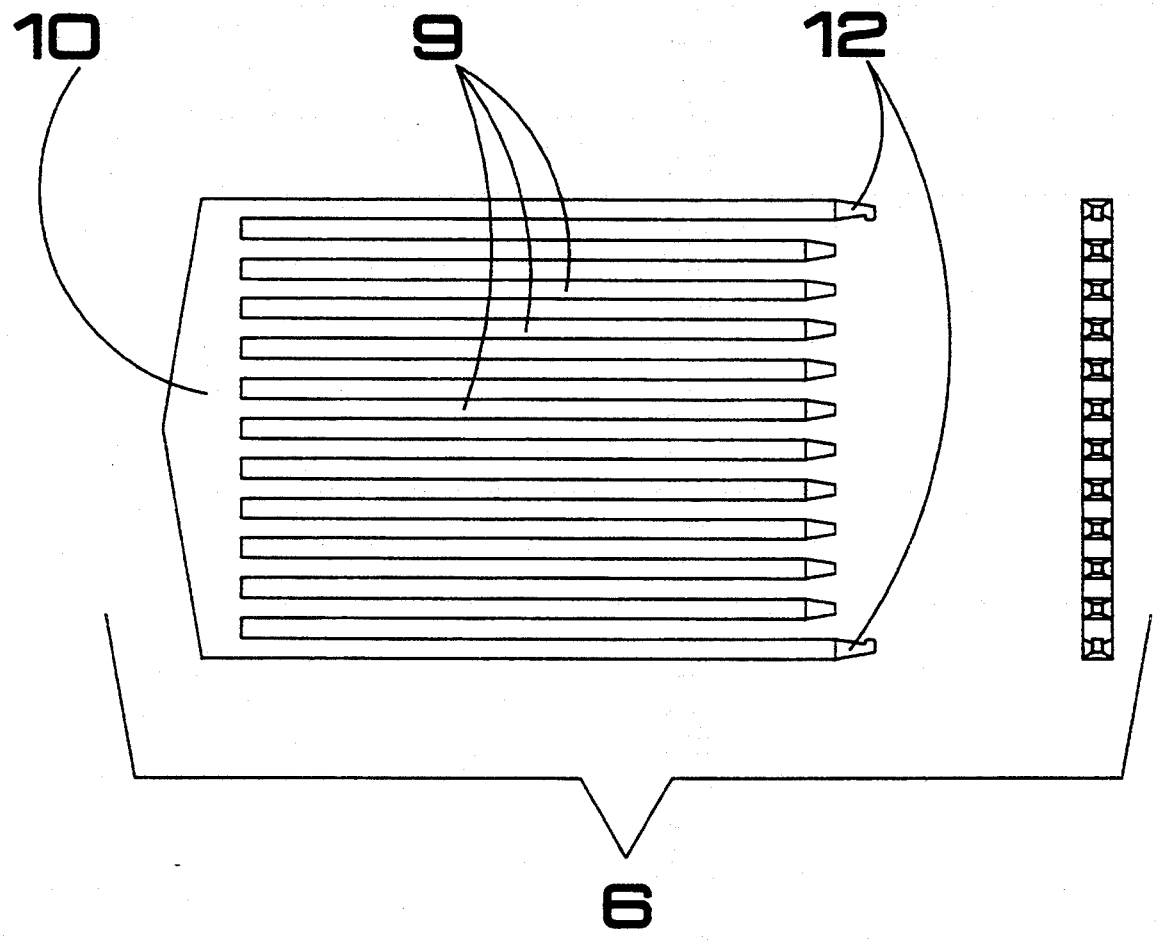
FIG. 1 shows the front and right hand view of the strainer with its fingers. The number of fingers and length of fingers have been arbitrarily chosen for the purpose of illustration.
Figure 2:
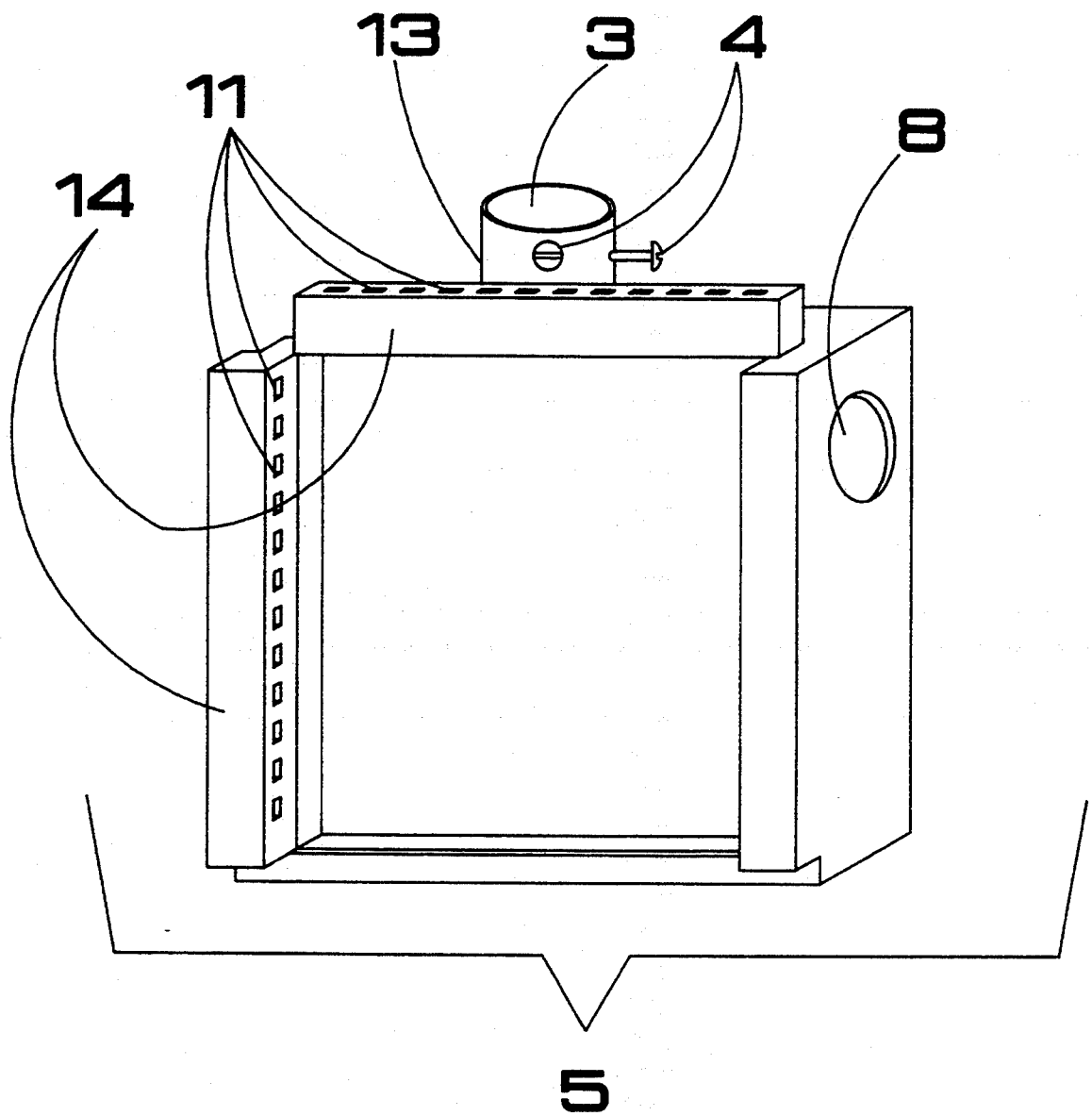
FIG. 2 shows the strainer box with the finger positioning holes.
Figure 3:
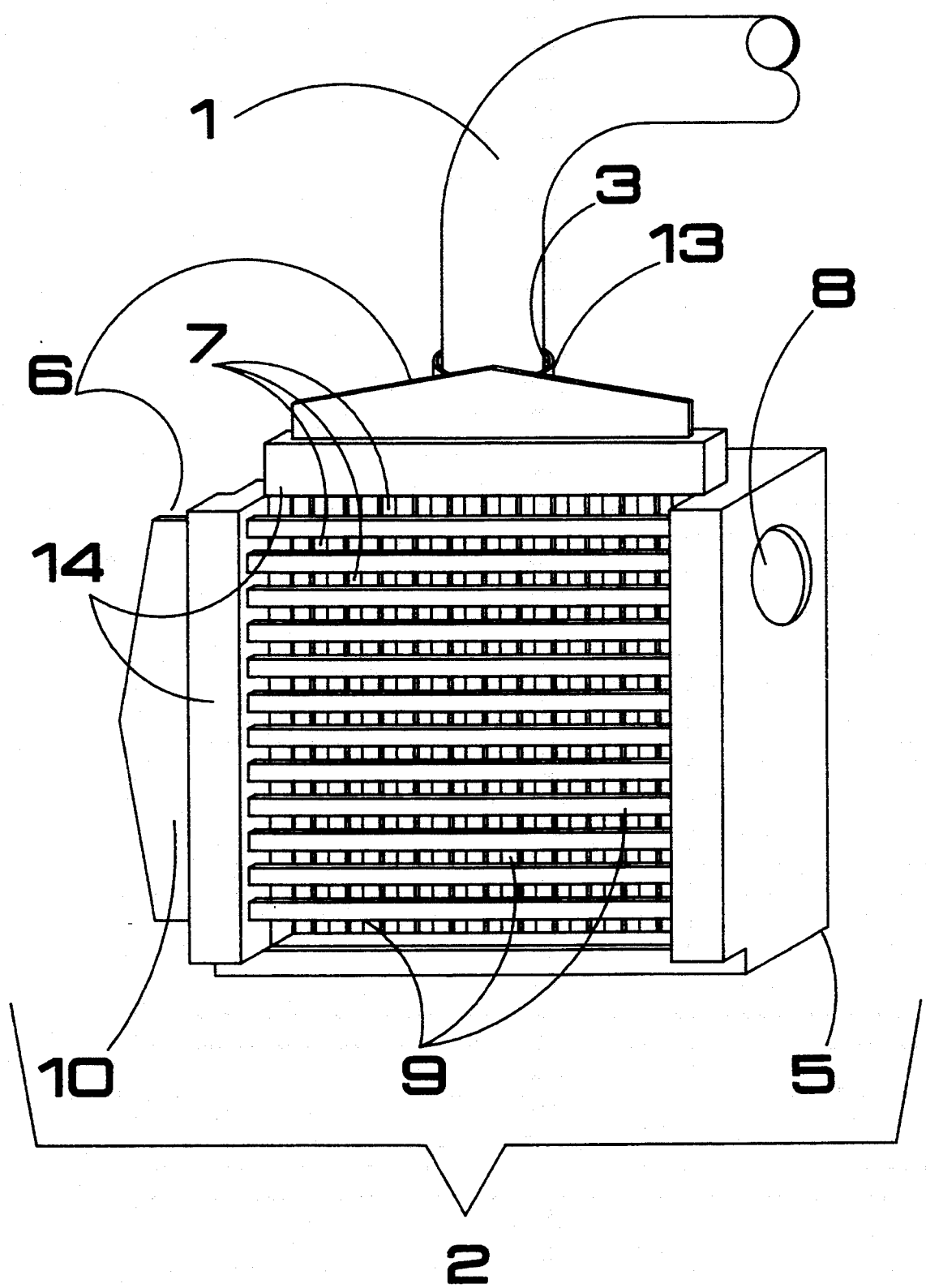
FIG. 3 shows the finger elements completely closed in the position for straining lint.

A lint strainer is attached to a discharge hose of a washing machine through which liquid may pass but lint is retained in the strainer. The discharge from a washing machine hose 1 enters the strainer assembly 2 through an inlet hole 3 of the conduit 13. Screws 4 are threaded into the conduit 13 to secure the washing machine hose 1 in the inlet hole 3 by clamping down on the washing machine discharge hose 1. The open side of the strainer box 5 is the outlet for the washing machine discharge and location for the strainer 6. Water passes through the strainer box 5 and the holes 7 formed by the finger elements 6 but lint is retained in the strainer box 5 and the holes 7 formed by the finger element 6. Lint eventually accumulates in the holes 7 formed by the strainers 6 until water is flowing only through overflow hole 8 near the top of a side of the strainer box 5 indicating that the finger elements 6 needs cleaning. Overflow hole 8 also relieves washing machine discharge back pressure if the lint strainers 6 are totally full of lint thus blocking washing machine discharge. The fingers 9 of the finger element 6, with spaces between the fingers, are attached to a cross-member support 10 at one end, but are free-floating and unattached at the other end. The two identical or similar strainers 6, placed flat on top of each other, are oriented to form a matrix of holes 7 through both finger elements 6 in order to trap lint. The fingers 9 of both finger elements 6 pass through positioning holes 11 formed in adjacent sides of the strainer box 5 which are an integral part of the strainer box 5. Positioning holes 11 conform to the finger 9 outer surface but are large enough to enable easy sliding of the fingers 9 back and forth through the positioning holes 11 and are small enough to cause a wiping action on the accumulated lint as each strainer 6 is retracted in the direction of arrows in FIG. 4. The wall thickness of the strainer box 5 is greater at the edges of the two adjacent sides 14 where the positioning holes 11 are formed in order to help keep the strainer finger elements 9 more secure. When the finger elements 6 are fully retracted, the lint is free from the finger elements 6 and ready for disposal. The enlarged finger tips 12 on the ends of the finger elements 6 help prevent complete removal of the finger element 6 from the strainer box 5.

These tips 12 on the end fingers are large enough to give a force fit of these finger ends 12 into the positioning holes 11. Once all the finger elements 9 have been inserted into the positioning holes 11, the end finger elements with the enlarged tips 12 help prevent complete removal of the finger elements 6 from the strainer box 5 when they are retracted to remove lint. The tips of the fingers 9 are tapered so that the fingers 9 will glide smoothly past each other without interference when retracting and closing.

The opening of the strainer box 5 by retracting the strainer 6 cleans the strainer 6 and is thus self cleaning as the strainer box 5 is opened.

The foregoing description of the preferred embodiment is not intended to be exhaustive or to limit the invention to the precise form disclosed. Modifications are possible and within the scope of this invention.

What is claimed is:

1. A self-cleaning box-shaped lint strainer for a washing machine discharge comprising a box element, a first finger element, and a second finger element;

said box element having sides arranged in a rectilinear shape, at least two perpendicular said sides including a first and second set of holes extending along its length;

said first finger element comprising a cross member support having free floating fingers extending parallel to one another;

said second finger element comprising a cross member support having free floating fingers extending parallel to one another;

said first and second set of holes receiving the floating finger of said first and second finger elements, respectively, to form a porous straining surface;

wherein said first and second finger elements may be withdrawn to clear the straining surface of any accumulated debris.

* * * * *